United States Patent [19]

Rindner

[11] 3,831,588

[45] Aug. 27, 1974

[54] PRESSURE SENSING DEVICE
[75] Inventor: Wilhelm Rindner, Lexington, Mass.
[73] Assignee: Device Research Inc., North Billerica, Mass.
[22] Filed: Oct. 16, 1972
[21] Appl. No.: 297,778

[52] U.S. Cl........ 128/2.05 E, 128/2 H, 128/2.05 D, 73/406, 73/71.5 U, 128/348
[51] Int. Cl............................................... A61b 5/02
[58] Field of Search.. 128/2 R, 2.05 E, 2 H, 2.05 D, 128/348, 349, 2.05 N; 73/71.5 U, 406, 389

[56] References Cited
UNITED STATES PATENTS

| | | | |
|---|---|---|---|
| 2,532,507 | 12/1950 | Meunier | 73/71.5 U |
| 2,549,049 | 4/1951 | Bierman | 128/2.05 E |
| 3,090,377 | 5/1963 | Salisbury et al. | 128/2.05 E |
| 3,418,853 | 12/1968 | Curtis | 128/2.05 E |
| 3,447,378 | 6/1969 | Dunegan et al. | 73/406 X |
| 3,545,275 | 12/1970 | Harrison | 128/2 H |
| 3,553,625 | 1/1971 | Stedman | 128/2.05 E |
| 3,565,056 | 2/1971 | Statham | 128/2.05 E |
| 3,628,526 | 12/1971 | Bigliano | 128/2.05 E |

FOREIGN PATENTS OR APPLICATIONS

| | | | |
|---|---|---|---|
| 1,294,914 | 4/1962 | France | 128/2.05 E |

*Primary Examiner*—Aldrich F. Medbery
*Attorney, Agent, or Firm*—Edgar H. Kent, Esq.

[57] ABSTRACT

A pressure sensor which produces an electric output proportional to pressure on it is housed in a chamber having a flexible membrane for transmitting external pressure to the sensor. Means are provided for varying the pressure in the chamber by known amounts thus enabling calibration of the pressure sensing system while the sensor is at the site.

8 Claims, 5 Drawing Figures

PATENTED AUG 27 1974 3,831,588

PRESSURE SENSING DEVICE

BACKGROUND OF THE INVENTION

1. Field of the Invention

This invention relates to pressure sensing devices, in particular such devices wherein a small and delicate sensor is mounted for placement in intravenous and other difficulty accessible sites and is arranged to provide pressure determinations to a remote control station.

2. Description of the Prior Art

There has been an increasing demand for pressure sensors, or transducers, suitable for measuring pressure, such as blood pressure, within the human body and similar difficulty accessible sites where high accuracy is of the utmost importance. Many of them can be made in minute dimensions so that they may be housed at the ends of or within catheters of small enough diameter to be introduced to the desired site of restricted dimensions.

However, certain problems have hampered such usage o snsors or transducers. One such problem of major proportions has been the lack of a satisfactory way of calibrating the instrument after it has been inserted to its site. The minute sensors involved are highly sensitive to environmental conditions, such as temperature changes, electrical or magnetic fields, and jars or sudden pressure load as may accidentally occur during insertion of the instrument or, in the case of medical application, due to movement of the patient. The instrument should therefore be calibrated after it is placed in situ, and from time to time while in use, to adjust output readings against changes in pressure sensitivity and base line that may have occurred.

Heretofore, in situ calibration has been accomplished in some cases with a second remote sensor pressure-coupled to the site by a liquid column in a lumen inserted with the transducer to the site. Such calibration has numerous disadvantages including inability of the second sensor to follow rapid pressure changes, its added expense and the difficulties of providing and maintaining the liquid-filled lumen end unclogged at the site. In many cases therefore in situ calibration has been dispensed with, in consequence whereof errors are likely to occur due to undetected changes or drifts affecting the pressure-sensitivity of the transducer.

Another difficulty with some such pressure sensing devices has been that the catheter containing the sensor at one end has been permanently hermetically sealed. Hence changes in the external ambient pressure (which may be a fluctuating pressure applied to a patient) are not balanced by corresponding changes internally of the sensor chamber so that the sensor readings include, and vary with, such pressure fluctuations. Errors will then occur unless a complicated compensation adjustment of sensor readings is made according to measurements of changes in the external ambient pressure.

SUMMARY OF THE INVENTION

An object of this invention is to provide a pressure sensing device which is subject to in situ calibration by its response to pressure changes of known magnitude induced upon it.

Another object is to provide such a device which is less costly and more reliable than aforesaid prior equipment for effecting in situ calibration.

A further object is to provide such a device wherein ambient pressure or a controlled fixed pressure may optionally be maintained in a chamber containing the sensor.

In attaining the foregoing objects, the invention utilizes a sensor or transducer, preferably of the p-n junction type, wherein changes in pressure on the sensor are reflected in changes in electric output from the sensor. The sensor is housed in a chamber at one end of a hollow tube or catheter, which is hermetically sealed to the exterior of the tube by a flexible membrane through which external pressure is operatively transmitted to the transducer. The transducer itself may if desired be hermetically sealed. If of the electrical type, wires may extend through the tube to connect the transducer to external measuring instruments. However, wireless connections may be used.

In accordance with the invention, means are provided for applying to the tube, and to the interior side of the pressure-transmitting membrane, pressure changes of known magnitude. Such means may have various forms such as a simple bellows or depressible-expandable diaphragm on the remote end of the tube, or a more elaborate vacuum pump with arrangements for optional connection of the remote end of the tube to its pressure or suction side. After the tube end with transducer chamber has been inserted to the desired site, e.g., in vivo intravascular for blood pressure measurement, one or more pressure changes of known magnitude, as may be indicated by a suitable pressure measuring device, are applied to the tube and so to the inside of the transducer diaphragm. The sensor signal interpreting equipment can then be re-calibrated if the electrical response from the sensor is greater or less than it should have been according to the previous calibration. Optionally, the tube may be opened to atmospheric pressure between calibrations.

In one form of the device the diaphragm or membrane of the sensor chamber is directly mechanically coupled to the transducer. In another form, the membrane is not so coupled but is sufficiently flexible to be drawn into pressure-transmitting engagement with the sensor by negative pressure applied to the tube by the aforesaid pressure changing means. This latter form has an advantage for uses such as intravascular insertion, in that the pressure in the tube may be maintained during insertion and withdrawal of the sensor tube end at a pre-set value sufficient to hold the diaphragm away from the sensor, and so to shield the sensor from excessive stresses on the membrane consequent on such insertion and withdrawal of the sensor tube end. Such stresses during insertion and withdrawal from intravascular or similar sites have been a primary cause not only of sensitivity changes of the sensor, but also deterioration and short life of the sensor.

Preferred sensors are tunnel diode transducers (TDT) using mesa diodes formed for example from Germanium, Gallium Arsenide or Gallium Antimonide. Extremely sensitive and accurate sensors can be provided of this type in the minute dimensions normally needed in medical and certain other examples. Suitable transducers of this type are shown in U.S. patent of myself and others, U.S. Pat. No. 3,566,459, Mar. 2, 1971.

DESCRIPTION OF THE PREFERRED EMBODIMENTS

Figure 1:
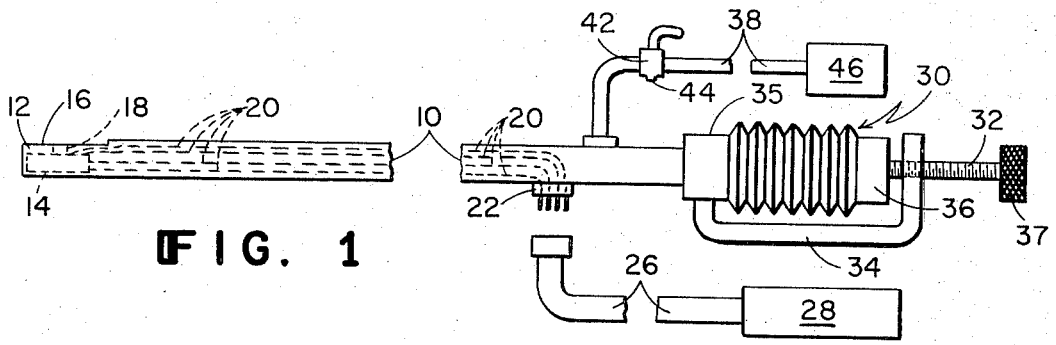
FIG. 1 is a side elevation view, partially broken away, of a pressure sensing device according to the invention, with the sensor shown diagrammatically.

Referring to FIG. 1, a tube 10 which, for medical uses, may be a plastic flexible catheter having an I.D. of the order of 1 M M and a length of about 1 meter, has, at its lefthand end in FIG. 1, a sensor chamber 12 containing a sensor 14 to which external pressure is transmitted by a flexible membrane 16 forming a wall of chamber 12, through a mechanical connection 18 between the membrane and the sensor. Chamber 12 may be a part of the catheter itself as indicated, in which case the membrane may either be a portion of the catheter of increased flexibility, or a separate membrane adhesively sealed around an opening in the catheter. Alternatively, a metal-walled chamber 12 may be provided attached to the catheter end as in FIG. 4, which has the flexible membrane hermetically sealed over an opening in one of its walls.

Four electrically conductive insulated wires 20 connect the terminals of sensor 14 with the terminals of a plug 22 hermetically sealed to the exterior of tube 10 adjacent its end opposite sensor 14. A socket 24 removably receives plug 22 to connect wires 20 via 4-conductor cable 26 in circuit with responsive equipment indicated by box 28. Equipment 28 includes suitable devices, which may be conventional, for applying any required electrical power to the sensor via wires 20 for activating it to yield a variable electrical output according to variable pressure applied thereto and for providing temperature readings. Equipment 28 may also include means for translating electric output from the circuit including sensor 14 into pressure indications, and may include a visible dial, a pen-chart recorder, a CRT, or the like.

Tube 10 has its end opposite sensor 14 closed by a bellows 30, preferably of flexible metal. The bellows is adjustable to desired positions between expanded and contracted by means of a screw threaded rod 32 projecting through a correspondingly threaded bore in one end of a bracket arm 34 the other end of which is connected to the fixed end collar 35 of the bellows by which it is attached to tube 10. Rod 32 bears against the free end collar 36 of the bellows so that when rotated in one direction by its end knob 37, it progressively collapses the bellows, and when rotated oppositely, it permits the bellows to expand by virtue of its resilience. A tap line 38 leads from the interior of tube 10 adjacent bellows 30, through a demountable sealing connection 40, and a manually controlled valve 42 by which it may be opened to atmosphere through controlled port 44, to a pressure indicator 46, which may be of the visible dial or recording types.

In using the embodiment of FIG. 1, the tube end having the sensor chamber is inserted to the desired site. With valve 42 closed to atmosphere and open to pressure indicator 46, one or more pressure changes as indicated by said indicator, either positive or negative or both in the alternative, are induced in tube 10 and on the inner side of membrane 16 by appropriate expansion or contraction of bellows 30 by adjustment of knob 37. The sensor output to equipment 28 is then noted and recalibration thereof with respect to that output from the sensor may then be made if required. After in situ calibration, valve 42 may be turned to open the system and the inner side of membrane 16 to ambient pressure, so that changes therein will cancel out and not affect the sensor pressure readings. Periodic such checks and calibration adjustments can be made during use as may be desirable.

Figure 2:
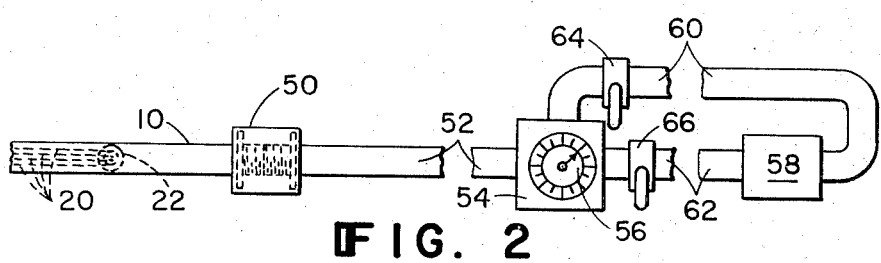
FIG. 2 is a top plan view of a modification of that part of the device of FIG. 1 at the righthand side of the break therein.

In the modification shown in FIG. 2 the end of tube 10 opposite the sensor-containing compartment has a threaded extension to receive thereover a pressure-tight connector 50 rotatable on the end of a tube 52. Tube 52 communicates with a chamber 54 which has means for indicating the pressure therein, for example, dial 56. Chamber 54 is connected to a gas pump 58 by tubes 60 and 62, one of which is connected to the suction input and the other of which is connected to the pressure output of pump 58. Valves 64, 66 in tubes 60 and 62, respectively, can be manipulated to cause pump 58 to provide predetermined pressure, positive or negative, in chamber 54, tubes 52 and 10 and on the underside of membrane 16. Either of valves 64, 66 may be provided with an exhaust port which may be opened by the valve to open chamber 54 and tubes 52 and 10 to atmosphere.

The operation of the device of FIG. 2 is like that of FIG. 1, using valves 64 and 66 to apply positive or negative pressures to chamber 54 and connected tubes from pump 58, or to open the system to atmosphere.

It will be noted that in both embodiments of FIGS. 1 and 2 tube 10 can be disconnected from electrical and other equipment at its external end as is desirable for sterilization of the tube (bellows 30 can be detachably mounted on tube 10 if it is not desired to include it in the sterilization process). When so detached tube 10 is unsealed and this is important since the sterilization may be carried out under vacuum and the sealed-in pressure of a permanently sealed tube such as has been used heretofore can subject the membrane to severe and damaging pressure when in a vacuum.

Figure 3A:
FIGS. 3A and 3B are partial side elevation views of a modification of that part of the device of FIG. 1 at the lefthand side of the break, showing respectively two different positions of the pressure-applying membrane relative to the transducer.
Figure 3B:
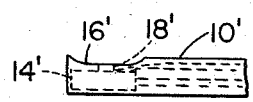

The modification of FIGS. 3A and 3B differs from FIG. 1 in that the connector 18' between membrane 16' and sensor 14' is not secured to the top of the sensor as is the connector 18 of FIG. 1 so that it may be moved away from and out of operative engagement with the sensor by inner pressure on membrane 16' as shown in FIG. 3A. However, membrane 16' has sufficient flexibility to be drawn inwardly until connector 18' is in pressure-transmitting operative engagement with the sensor by application of a sufficiently lower pressure to tube 10', as shown in FIG. 3B. In use of this modification, when tube 10' is being inserted to locate its sensor end at the desired site, tube 10 is held at a pressure sufficient to maintain membrane 16' spaced from sensor 14' sufficiently so that connector 18' is not in operative pressure-transmitting contact with the sensor even under pressures exerted on the membrane incident to such insertion, thus protecting the sensor from such pressures to which it would be exposed in the FIG. 1 embodiment. When the sensor chamber is at the site, a reduced pressure applied to tube 10' sucks the membrane from the position of FIG. 3A to that of FIG. 3B in which external pressure on the membrane is transmitted through connector 18' to the sensor, and calibration of the instrument can proceed as described in connection with FIGS. 1 and 2. Membrane 16' may be so constructed as to assume the position of FIG. 3B at atmospheric pressure within and outside tube 10' so that application of superatmospheric pressure to tube 10' is required to hold the membrane in the away position of FIG. 3A, thus enabling the device to operate at atmospheric pressure in tube 10', as may be desired. It will be appreciated that similar operation can be obtained if connector 18' is connected to the sensor but is loosely contacted by the membrane.

Figure 4:
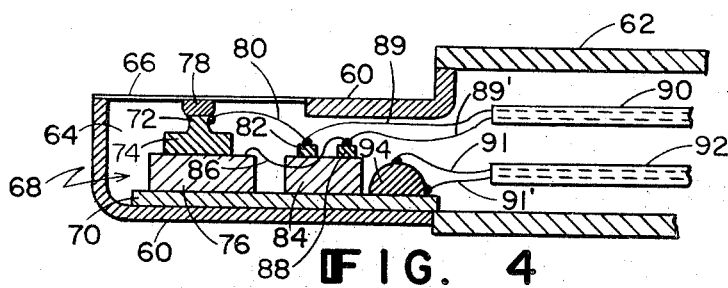
FIG. 4 is an enlarged longitudinal section view through a sensor and its housing at the end of a tube as may be utilized in FIGS. 1 or 2.

In FIG. 4 the sensor is housed in a thin metal capsule 60, which may be of stainless steel, secured and hermetically sealed to one end of a tube 62 such as the plastic catheter 10 of FIG. 1. Capsule 60, which forms the sensor chamber 64 of the device, has an opening in a wall thereof over which is secured and hermetically sealed a flexible membrane 66. The sensor, designated generally by the reference numeral 68, is mounted on an insulating base 70, which may be an epoxy resin, secured to a wall of capsule 60. Sensor 68 is a junction transducer of the mesa configuration 72 on top of a semiconductor 74 supported by, and in electric contact with, a base electrode 76 mounted on base 70. Transducer 68 may be of the single or multiple junction type. A mechanical connector 78, which may be of epoxy resin, is shown secured at opposite ends to membrane 66 and mesa 72 as is the connector 18 in FIG. 1, but it may be loose so that it may be separated from mesa 72 as in FIGS. 3A and 3B.

A conductive wire 80 electrically connects the top of mesa 72 to a first terminal 82 of a resistor chip 84 mounted on base 70. A second conductive wire 86 electrically connects electrode 76 with a second terminal 88 of resistor 84. Terminals 82 and 88 are connected to the ends of a pair of wires 89, 89' which are insulated from one another in a conduit 90 that extends through tube 62, and correspond to a first pair of the wires 20 of FIG. 1. Wires 91, 91', which similarly extend through conduit 92 and correspond to the other pair of wires 20 of FIG. 1, have their ends connected to the input and output terminals respectively of a thermistor 94 mounted on base 70.

Figure 5:
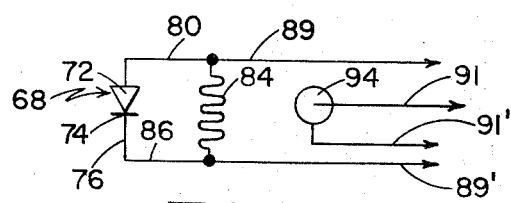
FIG. 5 is a circuit diagram of the sensor of FIG. 4.

FIG. 5 diagrams the transducer circuit of FIG. 4. It will be observed that resistor 84 of FIG. 4 is in shunt with transducer 68 and it serves to prevent generation of undesirable electrical oscillations. The voltage applied to conductors 89, 89', 91 and 91' may be A.C. or D.C. Thermistor 94 is a resistor the resistance of which changes as a known function of the temperature to which it is exposed, wires 91, 91' connecting the thermistor to the equipment 24. Therefore, electrical changes from these wires can be used to null out temperature-induced changes in the output of transducer 68 and, independently, to provide temperature readings. The thermistor can if desired be tapped off wire 89 for economy of wiring. A thermocouple or a second junction, rather than a thermistor, can be used for the same purpose. If desired, an hermetically sealed enclosure may be provided for transducer 68. In such case mechanical connection 78 may act through a flexible area of the enclosure overlying mesa 72, or may be connected to mesa 72 within the enclosure to underlie such a flexible area. Also, if desired, the transducer and all associated electrical connections including the wires to the instruments may be hermetically sealed in a first tube. A second tube or lumen is then provided having at one end a flexible membrane sealed to the end of the first tube overlying the transducer and arranged to act on it through the first tube. The other end of the lumen may be connected to the equipment for providing known pressure changes thereto and to the space between the membrane and the sealed tube surrounding the transducer, so that the device can be utilized in the same manner as the illustrated embodiments.

If desired, the changes in pressure in the tube can be effected by a thermo-electric device which is capable of heating or cooling a fixed volume of gas within the tube and thereby changing the pressure in the tube by predetermined increments.

I claim:

1. A pressure sensing device for insertion into the human body, means for measuring variable fluid pressures within the human body which includes a pressure sensor which provides an electric output proportional to fluid pressure exerted thereon, chamber means for housing said sensor including a flexible membrane arranged in a wall of said chamber opposite said sensor to exert on said sensor fluid pressure changes external to said housing and the outer side of said membrane to which said membrane is exposed, means for transmitting said sensor output to equipment responsive thereto, tube means connected to said chamber and in hermetically sealed communication with the inner side of said membrane, and calibration means for said sensor including means for applying fluid pressure changes of known magnitude to the interior of said tube means and to the inner side of said membrane and to said sensor, and means for indicating the response of said sensor to said fluid pressure changes interior and exterior of said chamber as a function of the electric output of said sensor proportional to said changes.

2. A pressure sensing device according to claim 1 wherein said tube means comprises a tube in hermetically sealed communication with said chamber.

3. A pressure sensing device according to claim 1 which includes a mechanical connection between said membrane and said sensor for transmitting to said sensor pressure applied to said membrane.

4. A pressure sensing device according to claim 2 suitable for intravenous use wherein said tube is a catheter.

5. A pressure sensing device according to claim 1 wherein said sensor is a junction transducer.

6. A pressure sensing device according to claim 1 which includes a temperature sensor in proximity to said pressure sensor which provides an electric output proportional to its temperature, and means for transmitting said temperature sensor output to equipment responsive thereto.

7. A pressure sensing device according to claim 1 wherein said pressure changes include atmospheric, subatmospheric and above-atmospheric pressures.

8. A pressure sensing device according to claim 1 wherein said calibration means includes a gas pump, means for optionally connecting said tube means to the suction or pressure sides of said pump for applying said pressure changes thereto, and means for indicating the pressures so applied.

* * * * *